United States Patent [19]

Saotome et al.

[11] Patent Number: 4,870,277

[45] Date of Patent: Sep. 26, 1989

[54] RADIATION IMAGE READ-OUT METHOD AND APPARATUS, AND RADIATION IMAGE READ-OUT AND REPRODUCING METHOD AND APPARATUS

[75] Inventors: Shigeru Saotome; Nobuyoshi Nakajima, both of Kanagawa, Japan

[73] Assignee: Fuji Photo Film Co., Ltd., Kanagawa, Japan

[21] Appl. No.: 316,833

[22] Filed: Feb. 28, 1989

Related U.S. Application Data

[63] Continuation of Ser. No. 62,800, Jun. 16, 1987.

[30] Foreign Application Priority Data

Jun. 16, 1986 [JP] Japan ................................ 61-139718
Jun. 16, 1986 [JP] Japan ................................ 61-139719

[51] Int. Cl.$^4$ ............................................. G01N 23/04
[52] U.S. Cl. ................................................. 250/327.2
[58] Field of Search .......................... 250/484.1, 327.2

[56] References Cited

U.S. PATENT DOCUMENTS 4,661,708 4/1987 Agano .......................... 250/484.1 B

*Primary Examiner*—Carolyn E. Fields
*Attorney, Agent, or Firm*—Sughrue, Mion, Zinn, Macpeak, and Seas

[57] ABSTRACT

In a radiation image read-out method and apparatus, a stimulable phosphor sheet carrying a radiation image stored thereon is exposed to stimulating rays which cause the stimulable phosphor sheet to emit light in proportion to the stored radiation energy, and the emitted light is photoelectrically detected to obtain an image signal representing the radiation image. Stimulating rays are made to pass through a beam diameter adjusting device, and the level of the stored radiation energy is detected. The beam diameter of stimulating rays is expanded by the beam diameter adjusting device as the level of the stored radiation energy decreases. In a radiation image read-out and reproducing method, a photosensitive material is exposed to a recording beam modulated with the read-out image signal for recording the radiation image thereon. The recording beam is made to pass through a beam diameter adjusting device, and the beam diameter of the recording beam is expanded by the beam diameter adjusting device as the level of the stored radiation energy decreases.

7 Claims, 2 Drawing Sheets

RADIATION IMAGE READ-OUT METHOD AND APPARATUS, AND RADIATION IMAGE READ-OUT AND REPRODUCING METHOD AND APPARATUS

This is a continuation of application Ser. No. 062,800 filed 6/16/87.

BACKGROUND OF THE INVENTION

1. Field of the Invention

This invention relates to a radiation image read-out method for reading out a radiation image stored on a stimulable phosphor sheet by exposing the stimulable phosphor sheet to stimulating rays which cause it to emit light in proportion to the stored radiation energy, and photoelectrically detecting the emitted light, and to an apparatus for carrying out the method. This invention also relates to a radiation image read-out and reproducing method for reading out a radiation image stored on a stimulable phosphor sheet to obtain an image signal and reproducing a visible image on a photosensitive material by use of the image signal, and to an apparatus for carrying out the radiation image read-out and reproducing method.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to a stimulating ray beam such as a laser beam which causes the stimulable phosphor sheet to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range of radiation exposure. More specifically, since the amount of light emitted upon stimulation after the radiation energy is stored on the stimulable phosphor sheet varies over a wide range in proportion to the amount of said stored energy, it is possible to obtain an image having a desirable density regardless of the amount of exposure of the stimulable phosphor sheet to the radiation, by reading out the emitted light with an appropriate read-out gain and converting it into an electric signal to reproduce a visible image on a recording medium or a display device.

Therefore, in the aforesaid radiation image recording and reproducing system, high sensitivity image recording may be conducted by adjusting the radiation dose to a very low value.

However, in the case where a radiation image is recorded on the stimulable phosphor sheet with a low radiation dose, only a low level of radiation energy is stored on the stimulable phosphor sheet, and the level of light emission by the stimulable phosphor sheet in proportion to the stored radiation energy becomes generally low. As a result, graininess of the visible radiation image reproduced based on the read-out image signal deteriorates (i.e. becomes more perceptible). Consequently, the reproduced visible image becomes rough, and the image quality thereof becomes low.

SUMMARY OF THE INVENTION

The primary object of the present invention is to provide a radiation image read-out method wherein graininess of a reproduced visible image is prevented from deterioration even though a radiation image is recorded on a stimulable phosphor sheet with a low radiation dose.

Another object of the present invention is to provide an apparatus for carrying out the radiation image read-out method.

A further object of the present invention is to provide a radiation image read-out and reproducing method wherein graininess of a reproduced visible image is prevented from deterioration even though a radiation image is recorded on a stimulable phosphor sheet with a low radiation dose.

A still further object of the present invention is to provide an apparatus for carrying out the radiation image read-out and reproducing method.

The present invention provides a radiation image read-out method in which a stimulable phosphor sheet carrying a radiation image stored thereon is exposed to a stimulating ray beam which causes the stimulable phosphor sheet to emit light in proportion to the stored radiation energy, and the light emitted by the portion of the stimulable phosphor sheet exposed to the stimulating ray beam is photoelectrically detected by use of a photodetector to obtain an image signal representing the radiation image, wherein the improvement comprises the steps of:

(i) making said stimulating ray beam pass through a beam diameter adjusting means, (ii) detecting a level of radiation energy stored on said stimulable phosphor sheet, and (iii) expanding the beam diameter of said stimulating ray beam by said beam diameter adjusting means in accordance with a decrease in said level of radiation energy stored on said stimulable phosphor sheet.

The radiation image read-out method is carried out by an apparatus provided with a means for emanating a stimulating ray beam to a stimulable phosphor sheet carrying a radiation image stored thereon, a means for moving said stimulable phosphor sheet with respect to said means for emanating the stimulating ray beam, and a photodetector for photoelectrically detecting light emitted by said stimulable phosphor sheet in proportion to the stored radiation energy upon exposure to the stimulating ray beam and obtaining an image signal representing the radiation image, wherein the improvement comprises the provision of:

(i) a beam diameter adjusting means for adjusting the beam diameter of said stimulating ray beam, (ii) a level detection means for detecting a level of radiation energy stored on said stimulable phosphor sheet, and (iii) a control means for receiving the output of said level detection means and controlling said beam diameter adjusting means to expand the beam diameter of said stimulating ray beam in accordance with a decrease in said level of radiation energy stored on said stimulable phosphor sheet.

The present invention also provides a radiation image read-out and reproducing method in which a stimulable phosphor sheet carrying a radiation image stored thereon is exposed to stimulating rays which cause the stimulable phosphor sheet to emit light in proportion to the stored radiation energy, the light emitted by the portion of the stimulable phosphor sheet exposed to the stimulating rays is photoelectrically detected by use of a photodetector to obtain an image signal representing the radiation image, and exposing a photosensitive material to a recording beam modulated with the image signal to reproduce and record the radiation image on the photosensitive material, wherein the improvement comprises the steps of:

(i) making said recording beam pass through a beam diameter adjusting means, (ii) detecting a level of radiation energy stored on said stimulable phosphor sheet, and (iii) expanding the beam diameter of said recording beam by said beam diameter adjusting means in accordance with a decrease in said level of radiation energy stored on said stimulable phosphor sheet.

The radiation image read-out and reproducing method is carried out by an apparatus provided with a means for emanating stimulating rays to a stimulable phosphor sheet carrying a radiation image stored thereon, a means for moving said stimulable phosphor sheet with respect to said means for emanating the stimulating rays, a photodetector for photoelectrically detecting light emitted by said stimulable phosphor sheet in proportion to the stored radiation energy upon exposure to the stimulating rays and obtaining an image signal representing the radiation image, and a means for emanating a recording beam modulated with the image signal to a photosensitive material, thereby to reproduce and record the radiation image on the photosensitive material, wherein the improvement comprises the provision of:

(i) a beam diameter adjusting means for adjusting the beam diameter of said recording beam, (ii) a level detection means for detecting a level of radiation energy stored on said stimulable phosphor sheet, and (iii) a control means for receiving the output of said level detection means and controlling said beam diameter adjusting means to expand the beam diameter of said recording beam in accordance with a decrease in said level of radiation energy stored on said stimulable phosphor sheet.

In the case where the beam diameter of the stimulating ray beam or the recording beam is expanded as mentioned above, the sharpness of the image reproduced by use of the image signal obtained by scanning with the stimulating ray beam, or the sharpness of the image reproduced and recorded on the photosensitive material by exposure to the recording beam decreases. The graininess of an image tends to deteriorate as the sharpness is improved. Therefore, when the sharpness is decreased as mentioned above, it is possible to prevent the deterioration of the graininess of the reproduced visible image.

Accordingly, with the radiation image read-out method and apparatus and with the radiation image read-out and reproducing method and apparatus in accordance with the present invention, it is possible to obtain a reproduced visible image of good graininess even from a stimulable phosphor sheet carrying a radiation image stored thereon with a low radiation dose. Therefore, it becomes possible to adjust the radiation dose as desired in the course of radiation image recording, and to always obtain a reproduced visible image having an improved image quality, particularly a high diagnostic efficiency and accuracy.

DESCRIPTION OF THE PREFERRED EMBODIMENTS

The present invention will hereinbelow be described in further detail with reference to the accompanying drawings.

Figure 1:
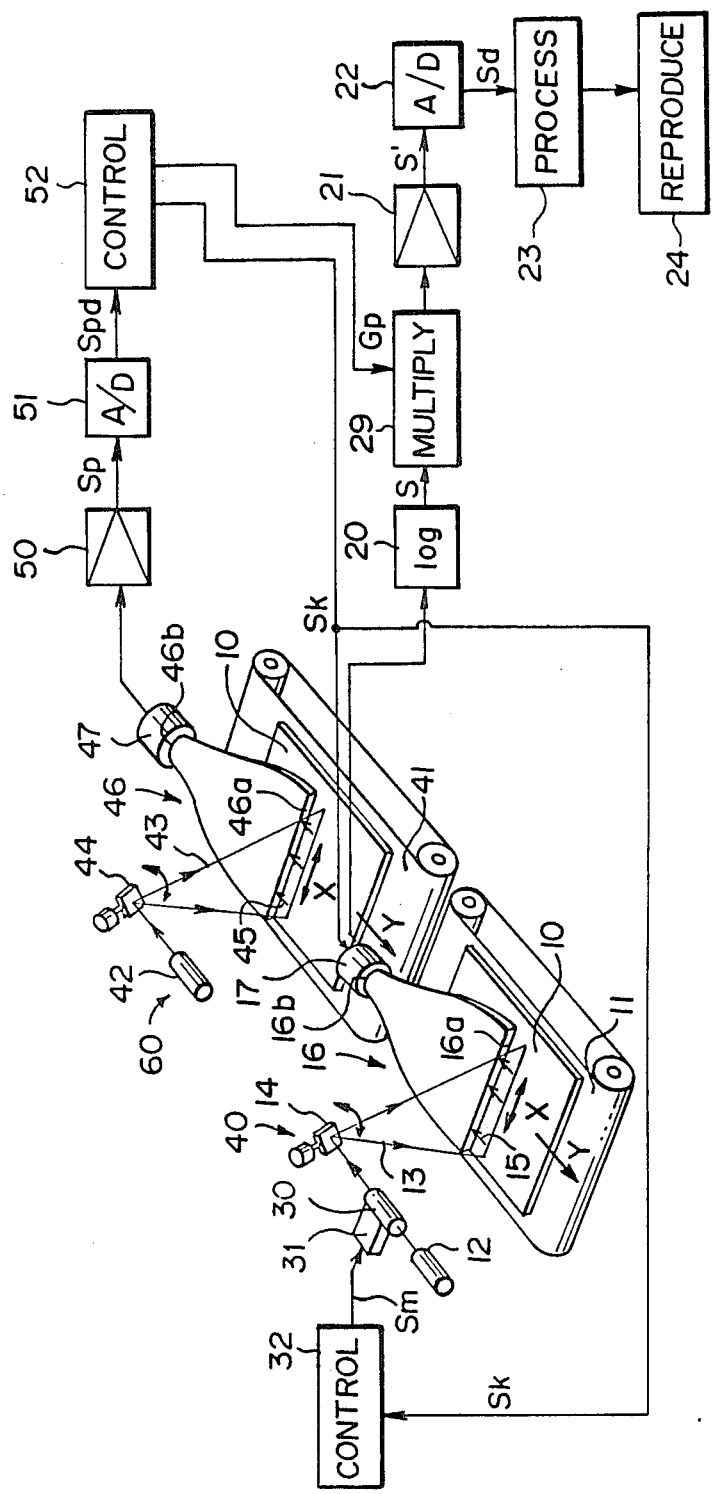
FIG. 1 is a schematic view showing the configuration of an apparatus for carrying out an embodiment of the radiation image read-out method in accordance with the present invention.

Referring to FIG. 1, a radiation image read-out apparatus is provided with a final read-out section 40 comprising a sheet conveyance means 11, a laser beam source 12 for emanating a laser beam 13, a light deflector 14, a light guide member 16 and a photomultiplier 17. The radiation image read-out apparatus is also provided with a preliminary read-out section 60 comprising a sheet conveyance means 41, a laser beam source 42 for emanating a laser beam 43, a light deflector 44, a light guide member 46, and a photomultiplier 47. The beam diameter of the laser beam 13 at the final readout section 40 is adjusted by a zoom beam expander 30. The stimulable phosphor sheet 10 carrying a radiation image of an object stored thereon by being exposed to a radiation such as X-rays passing through the object is first subjected to the preliminary read-out carried out for approximately ascertaining the image input information on the sheet 10 at the preliminary read-out section 60 before the final read-out is carried out at the final read-out section 40 for obtaining an image signal for use in reproduction of a visible image for viewing, particularly for diagnostic purposes.

First, the preliminary read-out will be described hereinbelow. At the preliminary read-out section 60, the stimulable phosphor sheet 10 carrying the radiation image stored thereon is conveyed by the sheet conveyance means 41 constituted by an endless belt or the like in a sub-scanning direction as indicated by the arrow Y. The laser beam 43 emanated as stimulating rays by the laser beam source 42 is deflected by the light deflector 44 constituted by a galvanometer mirror or the like, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 43, the exposed portion of the sheet 10 emits light 45 in an amount proportional to the stored radiation energy. The emitted light 45 is guided by the light guide member 46 and is photoelectrically detected by the photomultiplier 47 acting as a photodetector.

The light guide member 46 is made by the forming of a light guiding material such as an acrylic plate, and has a linear light input face 46a positioned to extend along the beam scanning line on the stimulable phosphor sheet 10, and a ring-shaped light output face 46b closely contacted with a light receiving face of the photomultiplier 47. The emitted light 45 entering the light guide member 46 from its light input face 46a is guided through total reflection inside of the light guide member 46, emanates from the light output face 46b, and is received by the photomultiplier 47. In this manner, the amount of the emitted light 45 carrying the radiation image information is detected by the photomultiplier 47. In the preliminary read-out step, stimulation energy of the stimulating rays (i.e. the laser beam 43) is adjusted to be smaller than the stimulation energy of the stimulating rays (i.e. the laser beam 13) used in the final read-out as will be described later.

The output of the photomultiplier 47 obtained by the preliminary read-out is amplified with a fixed read-out gain by a preliminary read-out logarithmic amplifier 50 into a preliminary read-out image signal Sp, which is then digitized by a preliminary read-out A/D converter 51 with a fixed scale factor (latitude). The digital preliminary read-out image signal Spd thus obtained is fed to a final read-out control circuit 52. Based on the preliminary readout image signal Spd approximately representing the radiation image stored on the stimulable phosphor sheet 10, the final read-out control circuit 52 outputs setting values Sk and Gp respectively representing the optimal read-out gain and the optimal scale factor.

After the preliminary read-out is finished, the stimulable phosphor sheet 10 is sent to the final read-out section 40 and subjected to the final read-out. At the final read-out section 40, the stimulable phosphor sheet 10 is exposed to the laser beam 13 in the same manner as at the preliminary read-out section 60. A light 15 emitted by the stimulable phosphor sheet 10 in proportion to the stored radiation energy when the sheet 10 is exposed to the laser beam 13 enters the light guide member 16 from its light input face 16a, is guided inside of the light guide member 16, emanates from a light output face 16b of the light guide member 16, and is received by the photomultiplier 17. In this manner, the emitted light 15 carrying the radiation image stored on the stimulable phosphor sheet 10 is detected by the photomultiplier 17.

An analog output signal generated by the photomultiplier 17 is logarithmically converted by a logarithmic converter 20, and fed as a read-out image signal S representing the amount of the emitted light 15, i.e. representing the radiation image, to an amplifier 21 via a multiplier 29 as will be described later. An amplified read-out image signal S' generated by the amplifier 21 is then digitized by an A/D converter 22. A digital read-out image signal Sd thus obtained is sent to an image reproducing apparatus 24 such as a CRT or a light beam scanning recording apparatus via an image processing circuit 23, and the radiation image which was stored on the stimulable phosphor sheet 10 is reproduced as a visible image by the image reproducing apparatus 24.

In the aforesaid final read-out step, image read-out conditions are adjusted to optimal values based on the information obtained by the preliminary read-out. Specifically, the setting value Sk corresponds to the radiation energy stored on the stimulable phosphor sheet 10, and the read-out gain in the final read-out is adjusted to an optimal value by changing the high voltage applied to the final read-out photomultiplier 17 in accordanc with the setting value Sk. Also, the multiplier 29 is disposed between the logarithmic converter 20 and the amplifier 21, and the multiplication factor of the multiplier 29 is changed in accordance with the setting value Gp, so that the scale factor (latitude) in the course of digitization by the A/D converter 22 is adjusted to an optimal value.

Features of the aforesaid embodiment for preventing the deterioration in graininess of the reproduced visible image even though the stimulable phosphor sheet 10 carries the radiation image stored thereon with a low radiation dose will be described hereinbelow. The aforesaid zoom beam expander 30 is operated by an actuator 31 which is controlled by a control circuit 32. The control circuit 32 receives the aforesaid setting value Sk, generates an actuator operation control signal Sm in accordance with the setting value Sk, and controls the actuator 31 so that the beam diameter of the laser beam 13 is increased as the level of the radiation energy stored on the stimulable phosphor sheet 10, which the setting value Sk indicates, decreases. When the beam diameter of the laser beam 13 is increased in this manner, the stimulable phosphor sheet 10 is scanned by the beam of stimulating rays having a larger diameter, and the sharpness of the visible radiation image reproduced by the image reproducing apparatus 24 on the basis of the read-out image signal S' (Sd) becomes low. As a result, as mentioned above, deterioration of the graininess of the reproduced visibl image is restricted, and a visible image suitable for viewing, particularly for diagnostic purposes can be obtained.

In order to adjust the beam diameter of the laser beam 13 as stimulating rays, instead of using the zoom beam expander 30 and the actuator 31, a collimator lens (which is incorporated in the laser beam source 12 in the embodiment of FIG. 1) for collimating the laser beam 13 may be disposed for movement in the optical axis direction, and may be moved in said direction by an actuator, thereby changing the collimated condition of the laser beam 13.

The level of the radiation energy stored on the stimulable phosphor sheet 10 may also be determined by a method other than the preliminary read-out. For example, since the radiation dose in the image recording step which fixes the level of the stored radiation energy is predetermined approximately constant in accordance with the image recording conditions such as the image recording portion of the object and the image recording method, the level of the stored radiation energy may be determined based on the information on the image recording conditions. Or, the level of the stored radiation energy may be determined by obtaining a signal corresponding to the radiation dose setting value from a photo-timer or the like for adjusting the radiation dose in the image recording step to a predetermined value.

Figure 2:
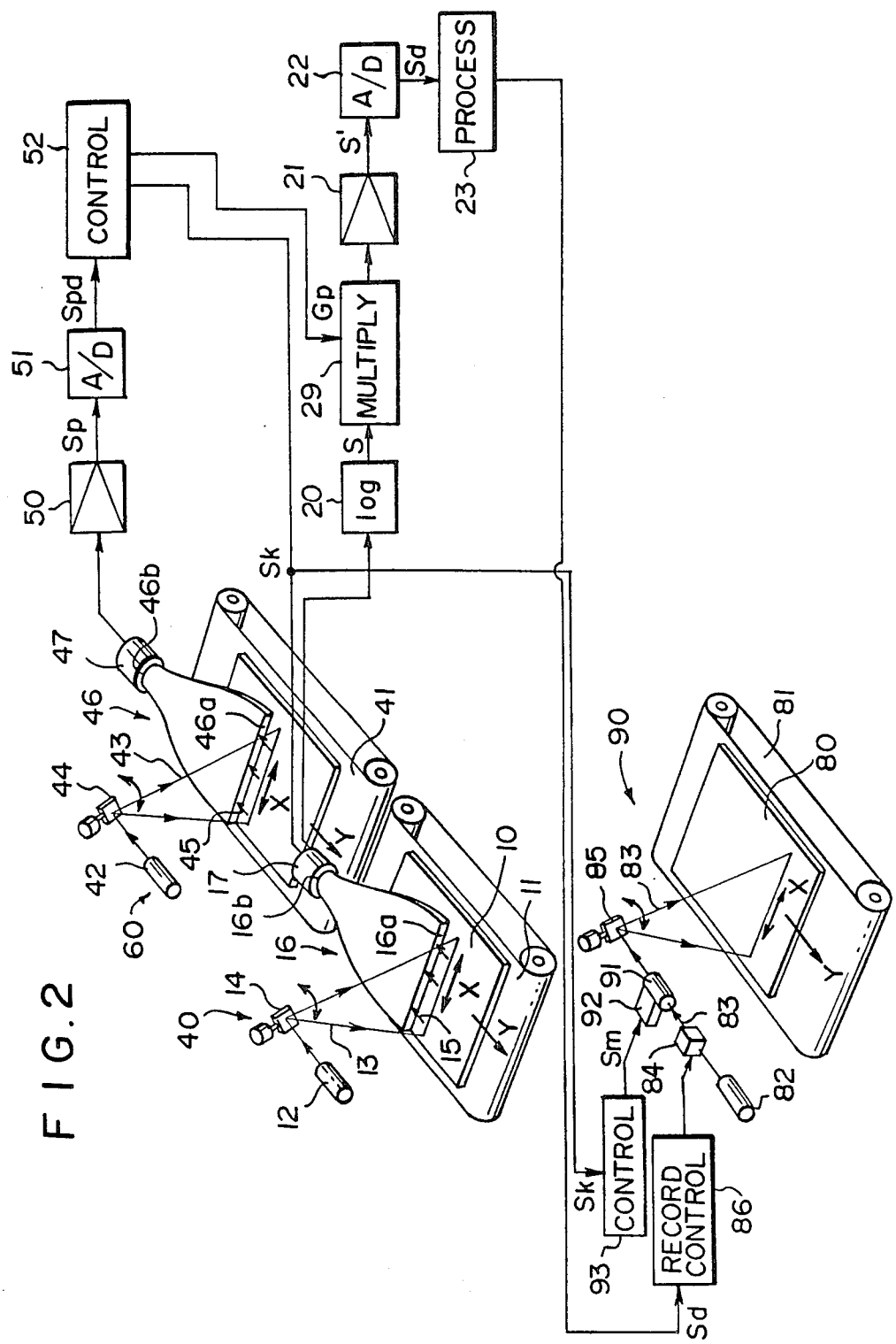
FIG. 2 is a schematic view showing the configuration of an apparatus for carrying out an embodiment of the radiation image read-out and reproducing method in accordance with the present invention.

A radiation image read-out and reproducing apparatus for carrying out a embodiment of the radiation image read-out and reproducing method in accordance with the present invention will hereinbelow be described with reference to FIG. 2. In FIG. 2, similar elements are numbered with the same reference numerals with respect to FIG. 1. The radiation image read-out and reproducing apparatus is provided with the final read-out section 40 and the preliminary readout section 60 having the same configurations as shown in FIG. 1, and a reproducing section 90 comprising a photosensitive material conveyance means 81, a laser beam source 82 for emanating a laser beam 83 acting as a recording beam, a light modulator 84, a light deflector 85, and a reproduction control circuit 86. The beam diameter of the laser beam 83 at the reproducing section 90 is adjusted by a zoom beam expander 91.

In the embodiment of FIG. 2, the preliminary readout at the preliminary read-out section 60 and the final readout at the final read-out section 40 are carried out in the same manner as mentioned with reference to FIG. 1. The digital read-out image signal Sd generated by the A/D converter 22 in the same manner as mentioned above is fed to the reproduction control circuit 86 at the reproducing section 90 via the image processing circuit 23.

Reproduction of a visible image by use of the readout image signal Sd obtained by the final read-out as mentioned above will be described hereinbelow. At the reproducing section 90, a photosensitive material 80 is conveyed by the photosensitive material conveyance means 81 constituted by an endless belt or the like in the sub-scanning direction as indicated by the arrow Y. The laser beam (recording beam) 83 emanated by the laser beam source 82 is deflected by the light deflector 85, and is made to scan the photosensitive material 80 in the main scanning direction as indicated by the arrow X approximately normal to the subscanning direction as indicated by the arrow Y. In this manner, the photosensitive material 80 is two-dimensionally exposed to the laser beam 83. Also, the laser beam 83 is modulated with the image signal Sd by the light modulator 84 which may be an acousto-optic modulator (AOM), an electrooptic modulator (EOM) or the like. Therefore, the radiation image which the image signal Sd represents is recorded on the photosensitive material 80.

Features of the embodiment shown in FIG. 2 for preventing the deterioration in graininess of the reproduced visible image even though the stimulable phosphor sheet 10 carries the radiation image stored thereon with a low radiation dose will be described hereinbelow. The aforesaid zoom beam expander 91 is operated by an actuator 92 which is controlled by a control circuit 93. The control circuit 93 receives the aforesaid setting value Sk, generates an actuator operation control signal Sm in accordance with the setting value Sk, and controls the actuator 92 so that the beam diameter of the laser beam 83 is increased as the level of the radiation energy stored on the stimulable phosphor sheet 10, which the setting value Sk indicates, decreases. When the beam diameter of the laser beam 83 is increased in this manner, the photosensitive material 80 is scanned by the recording beam having a larger diameter, and the sharpness of the visible radiation image reproduced on the photosensitive material 80 by use of the read-out image signal Sd becomes low. As a result, deterioration of the graininess of the reproduced visible image is restricted, and a visible image suitable for viewing, particularly for diagnostic purposes can be obtained.

In order to adjust the beam diameter of the laser beam 83 as the recording beam, instead of using the zoom beam expander 91 and the actuator 92, a collimator lens (which is incorporated in the laser beam source 82 in the embodiment of FIG. 2) for collimating the laser beam 83 may be disposed for movement in the optical axis direction, and may be moved in said direction by an actuator, thereby changing the collimated condition of the laser beam 83.

Also in the embodiment of FIG. 2, the level of the radiation energy stored on the stimulable phosphor sheet 10 may be determined by a method other than the preliminary readout as mentioned above.

We claim:

1. A radiation image read-out and reproducing method in which a stimulable phosphor sheet carrying a readiation image stored thereon is exposed to stimulating rays which cause the stimulable phosphor sheet to emit light in proportion to the stored radiation energy, the light emitted by the portion of the stimulable phosphor sheet exposed to the stimulating rays is photoelectrically detected by use of a photodetector to obtain an image signal representing the radiation image, and exposing a photosensitive material to a recording beam modulated with the image signal to reproduce and record the radiation image on the photosensitive material.
wherein the improvement comprises the steps of:
  (i) detecting a level of radiation energy stored on said stimulable phosphor sheet,
  (ii) making said recording beam pass through a beam diameter adjusting means, and
  (iii) expanding the beam diameter of said recording beam by said beam diameter adjusting means in accordance with a decrease in said level of radiation energy stored on said stimulable phosphor sheet.

2. A method as defined in claim 1 wherein said level of radiation energy stored on said stimulable phosphor sheet is detected by preliminary read-out which is carried out for approximately ascertaining the image information stored on said stimulable phosphor sheet by exposing said stimulable phosphor sheet to stimulating rays having stimulation energy of a level lower than the stimulation energy of the stimulating rays used in final read-out before said final read-out is carried out for obtaining said image signal.

3. A method as defined in claim 1 wherein said stimulating rays are a laser beam.

4. A radiation image read-out and reproducing apparatus provided with a means for emanating stimulating rays to a stimulable phosphor sheet carrying a radiation image stored thereon, a means for moving said stimulable phosphor sheet with respect to said means for emanating the stimulating rays, a photodetector for photoelectrically detecting light emitted by said stimulable phosphor sheet in proportion to the stored radiation energy upon exposure to the stimulating rays and obtaining an image signal representing the radiation image, and a means for emanating a recording beam modulated with the image signal to a photosensitive material, thereby to reproduce and record the radiation image on the photosensitive material,
wherein the improvement comprises the provision of:
  (i) a beam diameter adjusting means for adjusting the beam diameter of said recording beam,
  (ii) a level detection means for detecting a level of radiation energy stored on said stimulable phosphor sheet, and
  (iii) a control means for receiving the output of said level detection means and controlling said beam diameter adjusting means to expand the beam diameter of said recording beam in accordance with a decrease in said level of radiation energy stored on said stimulable phosphor sheet.

5. An apparatus as defined in claim 4 wherein said apparatus comprises a final read-out system and a preliminary read-out system respectively provided with said means for emanating stimulating rays, said means for moving said stimulable phosphor sheet with respect to said means for emanating the stimulating rays, and said photodetector, the level of stimulation energy of the stimulating rays in said preliminary read-out system being lower than the level of stimulation energy of the stimulating rays in said final readout, and said means for detecting the level of radiation energy stored on said stimulable phosphor sheet detects said level of the stored radiation energy on the basis of information obtained by preliminary read-out carried out by said preliminary read-out system.

6. An apparatus as defined in claim 4 wherein said stimulating rays are a laser beam.

7. An apparatus as defined in claim 4 wherein said recording beam is a laser beam.

* * * * *